UNITED STATES PATENT OFFICE.

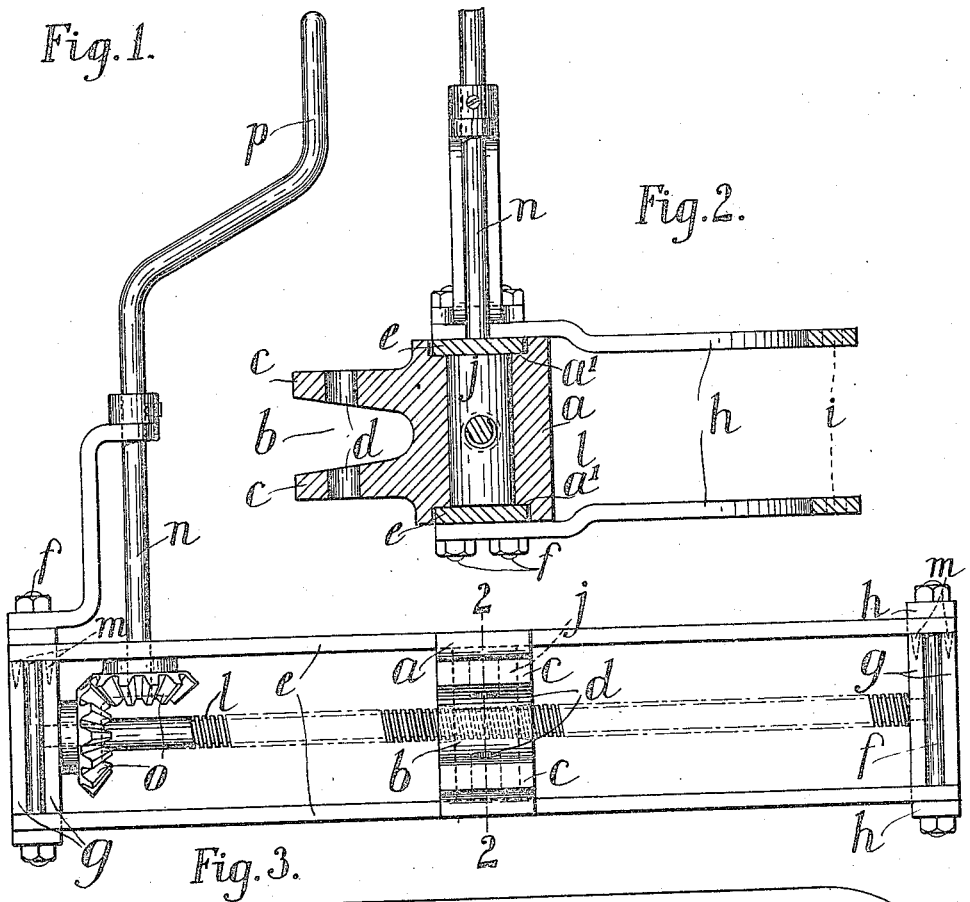

PERCY JAMES EDMONDS, OF WINCHESTER, ENGLAND.

DRAWBAR COUPLING FOR TRACTORS.

1,424,631.   Specification of Letters Patent.   Patented Aug. 1, 1922.

Application filed May 28, 1921. Serial No. 473,443.

*To all whom it may concern:*

Be it known that I, PERCY JAMES EDMONDS, a subject of the King of Great Britain, residing at 32 Christchurch Road, Winchester, Hants, England, have invented new and useful Improvements in Drawbar Couplings for Tractors, of which the following is a specification.

This invention relates to draw-bar couplings for use for connecting agricultural implements to tractors and has for its object to construct a coupling which may be operated whilst the tractor is in motion so that the relative positions of the latter and the implement may be altered without its being necessary for the operator to dismount.

According to the invention a coupling-link is caused to move laterally of the tractor or implement by means of a worm. For example, the said link is supported on, and is moved laterally along, a guide, and is attached to a nut engaging the worm which is rotated by a handle or hand-wheel through the medium of a pair of bevel-wheels.

To enable the invention to be fully understood, I will describe it by reference to the accompanying drawing, in which:—

Figure 1 is a rear elevation view of a draw-bar coupling constructed according to the invention and designed to be fixed to a tractor.

Figure 2 is a section on the line 2—2, Figure 1, and

Figure 3 is a plan of the coupling.

$a$ is a coupling link which is in the form of a block having a bifurcation $b$ to receive the usual draw-bar of the implement to be drawn, the jaws $c$ of the said bifurcation being provided with holes $d$ for the reception of the usual coupling pin. This block $a$ is designed to be moved laterally on the guide $e$ which extends at right angles to the coupling link $a$. This guide comprises a pair of plates or bars connected together by bolts $f$ and also maintained at a distance apart by distance-pieces or plates $g$ adjacent the said bolts, the block $a$ being formed with recesses $a^1$ which engage the said bars $e$. The guide $e$ is designed to be fixed to the tractor, and this can be effected in any suitable way, for instance, by a pair of bars $h$ secured to the guide $e$ by the bolts $f$ and provided with holes $i$ whereby it can be bolted to the tractor.

$j$ is the nut connected to the link $a$ and $l$ is the worm engaging the said nut and journalled at its ends in bearings formed in the inner plates $g$. The nut $j$ is in the form of a cylindrical pin supported vertically in a correspondingly shaped hole in the block $a$ which is thus free to swivel thereon to an extent limited by the sides of the recesses $a^1$, which sides are spaced apart to allow freedom of movement of the block $a$ along the bars $e$. Pins $m$ in the upper part of the guide $e$ engage the plates $g$ to prevent edgewise movement of the latter.

$n$ is a vertical shaft journalled in bearings in the plates of the guide $e$ and designed to rotate the worm $l$ by bevel-wheels $o$, a suitable handle $p$ being applied to the upper end of the said shaft within reach of the driver of the tractor.

By the described construction it will be seen that rotation of the shaft $n$ will, by means of the bevel wheels $o$, effect a corresponding rotation of the worm $l$ and consequent movement of the nut $j$ along the said worm, thereby altering the line of draught between the tractor and the implement being drawn thereby.

Claims.

1. A draw-bar coupling, comprising a coupling link to engage the draw-bar of the implement and having a cylindrical recess therein, a guide designed to be fixed transversely of the tractor and to engage the said link so that the latter can be moved along it, a cylindrical nut fitting within the recess in the link so that the latter can swivel thereon, a worm carried by the guide and engaging the nut and means for rotating the worm, to traverse the nut and coupling link, substantially as described.

2. A draw-bar coupling comprising a pair of transversely disposed parallel guides, a link provided with guiding recesses, engaging said guides and being provided with a vertical, cylindrical recess, a vertical, cylindrical pivot nut located in the cylindrical recess of the link, and a transversely disposed adjusting worm engaging a threaded aperture in said pivot nut, the walls of the guiding recesses of the link being spaced to allow the link to oscillate on the pivot pin with respect to the transverse guides engaged by said guiding recesses.

PERCY JAMES EDMONDS.